Feb. 19, 1957 G. L. GAMBLE ET AL 2,782,341
COAXIAL NOISE DIODE
Filed Dec. 22, 1952

INVENTORS: G. L. GAMBLE
L. A. JAKUS
BY
ATTORNEY

United States Patent Office 2,782,341
Patented Feb. 19, 1957

2,782,341

COAXIAL NOISE DIODE

Gordon L. Gamble, Morristown, and Lyle A. Jakus, Harding Township, Morris County, N. J., assignors to Bell Telephone Laboratories, Incorporated, New York, N. Y., a corporation of New York Application December 22, 1952, Serial No. 327,275

2 Claims. (Cl. 315—39)

This invention relates to electron discharge devices and more particularly to vacuum tubes of the coaxial type used for generating noise currents.

In the investigation of radio circuit noise it has been found convenient to measure the magnitude of such noise using a noise generator as a comparison standard.

Such a noise generator should be capable of operation over a wide band of frequencies and particularly in the ultra-high frequency range. For optimum performance the structure of a noise device should permit reflectionless termination of the circuit under test or for the transmission line serving to connect the noise device to the circuit. To satisfy these conditions noise diodes in the form of a section of coaxial line have been developed.

Previous devices have utilized a section of coaxial line having a filamentary cathode supported by the inner conductor, the outer conductor functioning as the anode. Energizing the filament through the inner conductor complicates the structure of such tubes and introduces electrical discontinuities making difficult the termination of the coaxial cable structure.

The use of noise generators is based on the random noise currents produced by such devices under temperature-limited conditions. Thus, when the current flow is limited by the cathode temperature, in other words, when all electrons emitted are attracted to the anode, the noise component of the anode current is $$\overline{i_1}^2 = 2eI_d\Delta f \tag{1}$$

where $\overline{i_1}$=root mean square value of noise current in amperes having frequency components lying in the band $\Delta f$
$e$=electron charge ($=1.59\times10^{-19}$ coulombs)
$I_d$=direct current anode current, amperes
$\Delta f$=frequency band over which noise current $\overline{i}$ is desired, in cycles.

In determining the noise factor of a radio receiver, for example, the noise generator is coupled to the receiver. The total receiver noise alone may be considered as a single noise current generator of value $$\overline{i_1}^2 = \frac{4kT\Delta f F}{50} \tag{2}$$

where $k$=Boltzmann's constant ($-1.37\times10^{-23}$ joules per degree K.)
$T$=absolute temperature, degrees K.
$F$=noise factor
$f$=as defined above.

By proportioning the noise power output of the noise source to that of the receiver, the noise factor becomes a direct function of the diode current. Hence, if the noise ouput of the receiver alone is first observed and the total output then doubled by superimposing the diode noise the above-noted relations may be equated and reduced to an expression in the form $$F=(\text{constant})I_d$$

By proper dimensioning F may be derived in decibels.

The relationships expressed in the above equations assume a purely resistive component of impedance within the noise device. The existance of a termination that is not purely resistive results in the measured space current developing an unknown voltage across an unknown impedance. It is apparent that accuracy of noise measurement will be enhanced by reducing capacitive components of impedance within the noise generator to a minimum and further by minimizing the standing-wave ratio as a result of the elimination of reflection-producing discontinuities in the noise device.

It is therefore an object of this invention to enable more accurate measurements of radio frequency noise.

A further object is to simplify the termination of transmission lines which include coaxial electron discharge devices.

Another object of this invention is to simplify the construction of a coaxial type vacuum tube particularly suitable for use as a noise generator.

These and other objects of this invention are accomplished in one specific embodiment in which a section of coaxial transmission line is evacuated and hermetically sealed. A filamentary cathode is located in a longitudinal recess formed by slotting the outer conductor for a portion of its length and installing thereover a cover plate. The emitting surface of the filament is maintained substantially coincident with the plane of the inner surface of the outer conductor. An insulated lead through the cover plate connects the filament with a variable direct current power source, the other filament terminal being grounded to the outer conductor. Thus the filament supply system being associated with the outer conductor rather than the inner does not complicate the termination of the transmission line section. For example, a simple carbon disc resistor with excellent standing wave ratio characteristics may be utilized.

When heated, the filamentary cathode emits electrons which, upon application of the proper potential, are collected by the inner conductor. The noise power output is then detectable at the coaxial line terminals.

It is therefore a feature of this device that the filamentary cathode is placed in a recess in the outer conductor with a termination in the outer conductor.

It is a further feature that power is introduced to the filament through an insulated seal in the outer conductor.

Another feature is the location of the filament substantially coincident with the plane of the inner surface of the outer conductor thereby reducing the capacitive effect between the inner and outer conductors.

Another feature resides in the simple carbon disc resistor with which the coaxial line section may be terminated.

A complete understanding of this invention and of these and other features thereof may be obtained from the following detailed description taken in connection with the accompanying drawing in which.

Figure 1:
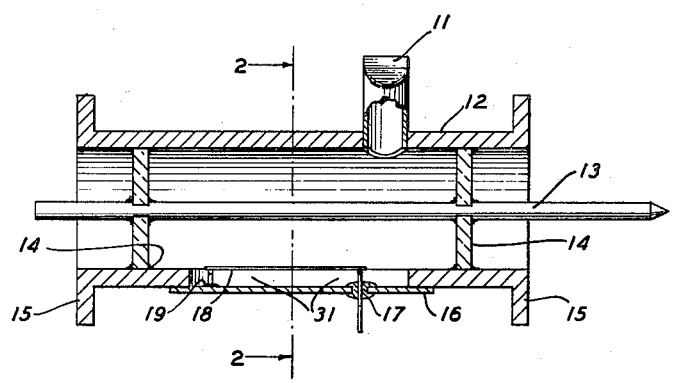
Fig. 1 is a central longitudinal sectional view of a vacuum tube constructed in accordance with a preferred embodiment of this invention.
Figure 2:
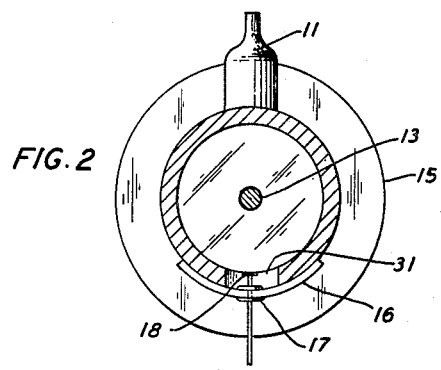
Fig. 2 is a transverse sectional view taken along the line 2—2 of Fig. 1.

The simple construction of this device is apparent from Fig. 1 in which an inner conductor 13 is coaxially supported within the outer cylindrical conductor 12 by the insulating discs 14, for example of glass. Positioned within a slot 31 in the outer conductor is the filamentary cathode 18 supported from the cover plate 16. The lead-in connection of the cathode is insulatedly supported by the glass bead 17, the other filament terminal 19 being grounded at radio frequency to the cover plate 16 which is, in turn sealed to the outer conductor. The grounded filament terminal is thereby maintained at the same potential as that existing in the outer conductor.

The support discs 14 and cover plate 16 provide airtight boundaries for the enclosed space which may then be evacuated and sealed through the connection 11 in the outer conductor 12. Energizing the filamentary cathode 18 sufficiently causes thermionic emission which may be collected by the inner conductor 13 when properly biased with respect to the filament.

Figure 3:
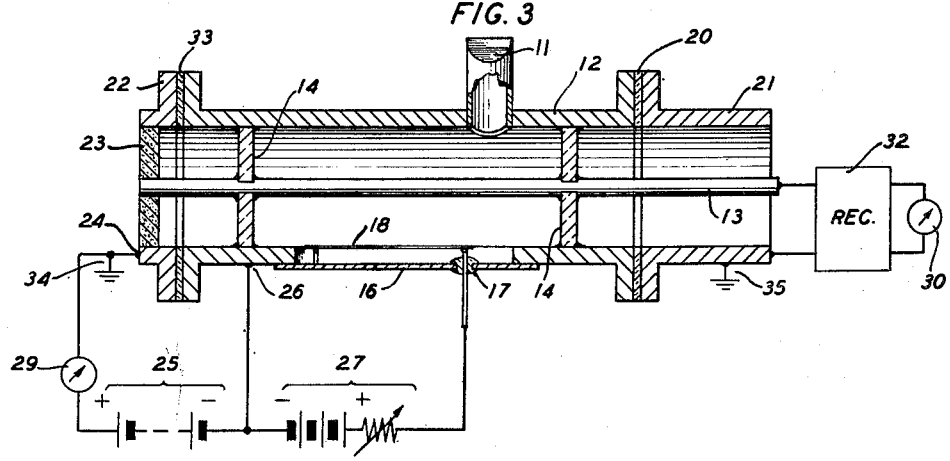
Fig. 3 is a central longitudinal section view of the device of Fig. 1 installed in a connecting line, also shown in section, with a schematic circuit diagram illustrating an application of the invention in the measurement of the noise factor of a receiver.

Referring to Fig. 3, the operation of a discharge device for determining the noise factor of a receiver or other electronic circuit is depicted. The combination utilizes a variable source of filament current 27 connected between the outer conductor and the lead-in conductor of the filamentary cathode. This energy is supplied at a comparatively low potential. A source of considerably higher potential 25 is connected between the outer conductor and the termination of the coaxial section. The meter 29 is provided in this circuit to indicate the space current $I_a$.

The input circuit of a receiver is shown by the coaxial section 21 which is coupled to the coaxial section comprising the discharge device. The coupling between the two line sections includes a dielectric ring 20 to insulate the receiver from the filament potential source represented by the battery 27. The receiver 32 is indicated by a block diagram with a suitable noise meter 30 attached to it.

The simplicity of the line termination section 22 is indicated by the disc 23 which may be advantageously a high purity carbon resistor. The need for bulky or complicated impedance matching devices is thereby obviated. Anode potential is applied to the inner conductor 13 through the carbon disc 23. Similarly to the input line coupling, the coupling to the termination section 22 includes a dielectric ring 33 insulating the potential source 25 from the other line sections. The outer conductors of the line sections 21 and 22 are connected through the ground connections 35 and 34, respectively.

It is to be understood that the above-described arrangement is illustrative of the principles of the invention. Other arrangements may be devised by those skilled in the art without departing from the spirit and scope of the invention.

What is claimed is:

1. An electron discharge device comprising a section of coaxial transmission line, said section comprising an outer cylindrical conductor having a longitudinal recess in the inner surface thereof, an inner conductor coaxially supported within said outer conductor, insulating members supporting said inner conductor, said members being hermetically sealed to said conductors, a connection in said outer conductor for evacuating and hermetically sealing said section, and thermionic cathode means in said recess of said outer conductor, said means comprising a filamentary cathode having an emitting surface substantially coincident with the plane of the inner surface of said outer conductor, said inner conductor adapted to serve as an anode.

2. In combination, an electron discharge device as recited in claim 1 having at one end an insulatedly attached coaxial section comprising input terminals, and at the other end, an insulatedly attached coaxial section terminating in a planar member of resistive material.

References Cited in the file of this patent

UNITED STATES PATENTS

| | | |
|---|---|---|
| 2,190,668 | Llewellyn | Feb. 20, 1940 |
| 2,463,368 | Finke | Mar. 1, 1949 |
| 2,466,063 | Varian | Apr. 5, 1949 |
| 2,637,003 | Johnson et al. | Apr. 28, 1953 |